D. C. HELLER.
Composition Pavement.
No. 51,513.
Patented Dec. 12, 1865.
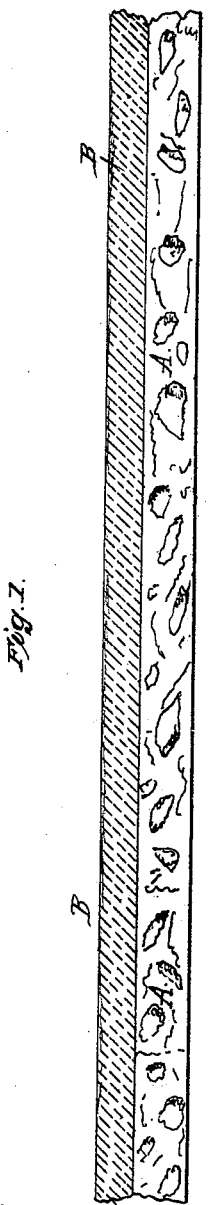

UNITED STATES PATENT OFFICE.

DANIEL C. HELLER, OF READING, PENNSYLVANIA, ASSIGNOR TO HIMSELF AND B. FRANK BOYER.

IMPROVED COMPOSITION PAVEMENT.

Specification forming part of Letters Patent No. 51,513, dated December 12, 1865.

*To all whom it may concern:*

Be it known that I, DANIEL C. HELLER, of Reading, in the county of Berks and State of Pennsylvania, have invented a new and useful Improvement in Composition Pavements; and I do hereby declare that the following is a full, clear, and exact description thereof, which will enable those skilled in the art to make and use the same, reference being had to the accompanying drawing, forming part of this specification.

The drawing, consisting of only one figure, represents a vertical section of my improved pavement.

The principal objection to composition pavements is that they are too soft, so that when exposed to the action of the hot sun they will soften, and sometimes even run, and that the frost will crack them.

The object of my invention is to obviate this objection and to furnish a pavement which will be drier, harder, less liable to be injured by heat or frost than any other composition pavement, and which will be perfectly water-tight; and it consists of a pavement formed by combining plaster-of-paris, litharge, coal-tar, sand, lime, and broken stone or equivalent, substantially in the manner and proportions hereinafter more fully described.

First I prepare a mixture for the lower part or base, A, of the pavement of the following ingredients and in about the following proportions, viz: one quart of dry slaked lime, one quart of coal-tar, and one-half bushel of broken stone or equivalent. The lime and tar form a paste, which adheres to and holds together the broken stone or other material with which it may be mixed, and forming a cohesive mass. This mixture A, I then spread over the ground upon which the pavement is to rest, and press it firmly down and together by passing over it a heavy roller. I then prepare a surface dressing, B, of the following ingredients and in the following proportions, viz: one pound of litharge, four quarts of coal-tar, two quarts of plaster-of-paris, and twenty quarts of sand. This I prepare by boiling the coal-tar and litharge to expel the water. I then add the plaster-of-paris and sand, mixing the whole together. The mixture B is then spread over the prepared base A and pressed down firmly by a roller, as before.

The pavement thus formed will dry almost instantly, will be water-tight, will be less affected by heat and frost, and will be drier and harder than the composition pavements heretofore made.

I claim as new and desire to secure by Letters Patent—

A composition pavement formed by combining plaster-of-paris, litharge, coal-tar, lime, sand, and broken stone or equivalent, substantially in the manner herein described, and for the purpose set forth.

DANIEL C. HELLER.

Witnesses:
CHARLES DAVIS,
GEORGE PRINTZ.